United States Patent [19]

Laipply et al.

[11] Patent Number: 4,793,637
[45] Date of Patent: Dec. 27, 1988

[54] TUBE CONNECTOR WITH INDICATOR AND RELEASE

[75] Inventors: Robert A. Laipply; John C. Field, both of Jackson, Mich.

[73] Assignee: Aeroquip Corporation, Jackson, Mich.

[21] Appl. No.: 95,681

[22] Filed: Sep. 14, 1987

[51] Int. Cl.⁴ .............................................. F16L 37/26
[52] U.S. Cl. ........................................ 285/39; 285/93; 285/176; 285/319; 285/921
[58] Field of Search .................... 285/39, 93, 176, 319, 285/314, 315, 921, 320, 321

[56] References Cited

U.S. PATENT DOCUMENTS

| 921,691 | 5/1909 | Friday | 285/319 |
|---|---|---|---|
| 1,504,363 | 8/1924 | Madigan | 285/39 |
| 2,892,991 | 6/1959 | Beebee et al. | 285/93 |
| 3,255,521 | 6/1966 | Callahan, Jr. | 285/39 |
| 3,826,523 | 7/1974 | Eschbaugh | 285/319 |
| 3,933,378 | 1/1976 | Sandford et al. | 285/319 |
| 3,997,196 | 12/1976 | Karcher et al. | 285/319 |
| 4,055,359 | 10/1977 | McWethy | 285/39 |
| 4,135,745 | 1/1979 | Dehar | 285/319 |
| 4,401,326 | 8/1983 | Blair | 285/93 |
| 4,440,424 | 4/1984 | Mode | 285/39 |
| 4,601,497 | 7/1986 | Bartholomew | 285/921 |
| 4,637,640 | 1/1987 | Fournier et al. | 285/319 |
| 4,647,082 | 3/1987 | Fournier et al. | 285/315 |
| 4,691,943 | 9/1987 | Deland et al. | 285/315 |

FOREIGN PATENT DOCUMENTS

| 215389 | 9/1941 | Switzerland | 285/93 |
|---|---|---|---|
| 542958 | 2/1942 | United Kingdom | 285/7 |

Primary Examiner—Randolph A. Reese
Assistant Examiner—Anthony Knight
Attorney, Agent, or Firm—Beaman & Beaman

[57] ABSTRACT

A push-to-connect tube connector for interconnecting conduits wherein a male part is received within a female part passage by relative axial displacement. Resilient fingers mounted upon one part cooperate with a shoulder defined on the other part to maintain the parts fully connected, seals interposed between the parts prevent leakage, and indicia means in the form of a sleeve axially displaceable upon the male part supports an indicator displaced thereon by the female part during connection to provide a visual indication of the degree of interconnection. A reference mark defined on the sleeve is masked by the indicator upon the parts being fully connected. Upon removal of the indicator, which is in the form of a split ring, the sleeve may be used to "open" the fingers to disconnect the parts, and in an embodiment non-circular transverse cross sections defined on the respective parts telescopingly cooperate during full connection to prevent relative rotation between the parts.

13 Claims, 1 Drawing Sheet

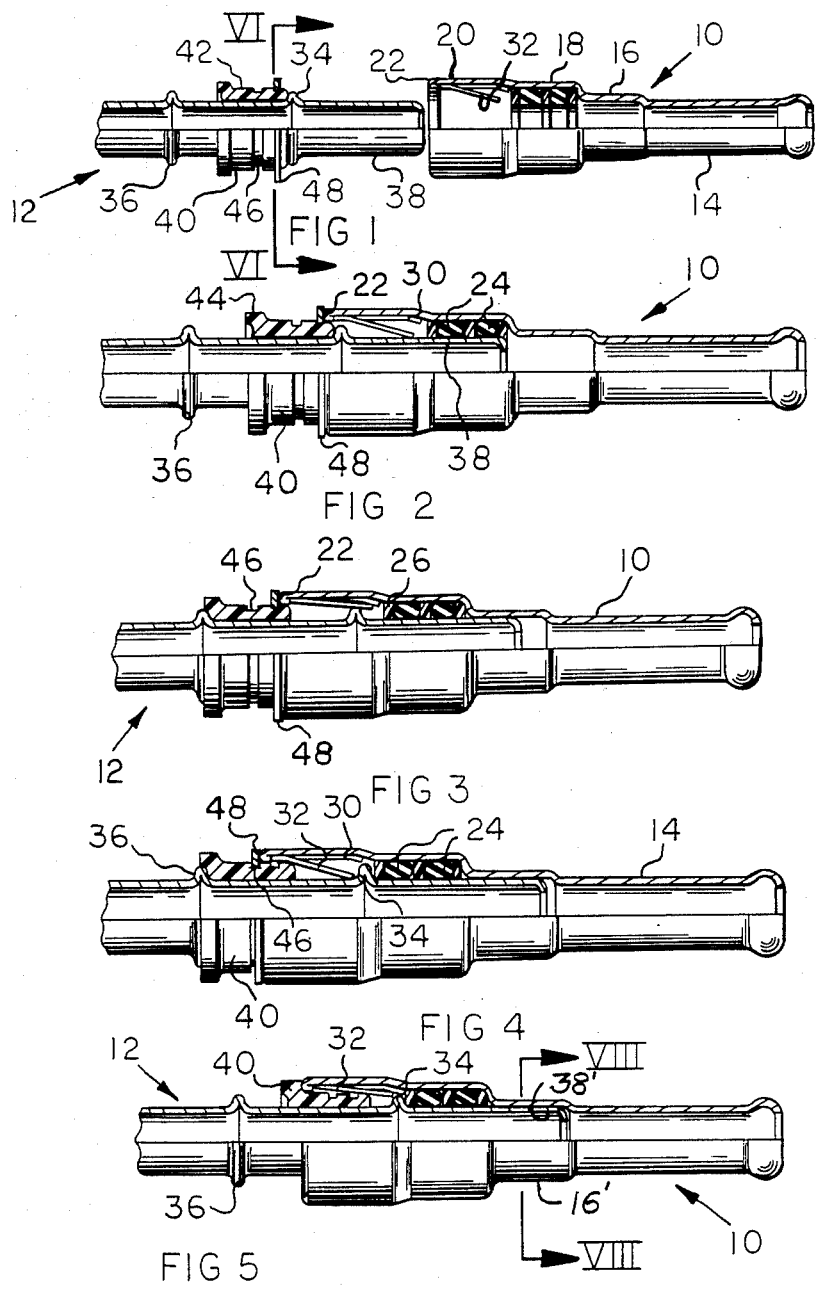

TUBE CONNECTOR WITH INDICATOR AND RELEASE

BACKGROUND OF THE INVENTION

Push-to-connect tube connectors are employed in the automotive field to interconnect flexible tubes for fuel lines, air conditioners, and the like. Such connectors consist of a female part having an open-ended passage defined therein telescopingly receiving a male part. Seals interposed between the parts prevent leakage, and retainers formed of resilient fingers mounted upon a part engage with a shoulder defined upon the other part upon the parts being fully connected to maintain the connection. Such connectors permit the parts to be very quickly connected by a relative axial displacement without requiring tools, and typical examples of this type of connector are shown in U.S. Pat. Nos. 3,933,378; 4,135,745 and the assignee's U.S. Pat. Nos. 4,637,640 and 4,647,082. Such tube connectors may also include means for releasing the resilient finger retainer such as shown in U.S. Pat. No. 4,647,082.

Tube connectors of the aforedescribed type are relatively inexpensive to manufacture, and desirable features include forming the connector of the smallest possible diameter for a given capacity, the primary components should be formed or stamped, the connection must be very stable and fluid-tight, and preferably, a visual indicator of connection is present and disconnect means are available which are easy to operate, and yet discourage tampering and unauthorized disconnection. Additionally, anti-rotation between the connector parts is often desirable.

Push-to-connect connectors presently available do not achieve all of the aforementioned features in a single construction, and the basic purpose of the invention is to provide a tube connector having such features.

It is an object of the invention to provide a low cost push-to-connect tube connector of the smallest possible diameter for a given capacity wherein the primary components are formed of drawn or stamped material and wherein interconnection of the connector parts produces a stable relationship.

An additional object of the invention is to provide a push-to-connect connector using a retainer formed of resilient fingers engaging a shoulder wherein the fingers may be released to permit disconnection of the connector parts and the finger release apparatus is permanently mounted upon one of the connnector members.

A further object of the invention is to provide a push-to-connect connector having male and female parts wherein a visual indicator is provided for permitting the operator to readily observe the relationship between the connector parts during connection and wherein indicia means are masked to indicate full connection providing a positive indication that full connection has been achieved.

An additional object of the invention is to provide a push-to-connect connector using male and female parts having resilient finger retaining means wherein finger release means mounted upon the male part cannot be operated to release the fingers without safety means being rendered inoperative.

Yet an additional object of the invention is to provide a push-to-connect tube connector having male and female parts connectable by relative axial displacement and wherein relative rotation between the parts is prevented during full connection.

In the practice of the invention a female stamped part includes a passage having an open end and a resilient finger retainer is mounted within the passage adjacent the end, circular sealing means are located within the passage and held in place by the retainer, and a reduced diameter portion inwardly of the seal receives the nose of the male part during full connection.

The male part includes a tubular nose received within the passage and a pair of axially spaced shoulders are defined on the male part having an axially displaceable sleeve located therebetween. The sleeve includes an annular exterior groove adjacent a cylindrical surface, and a split ring frictionally encompasses the sleeve cylindrical surface having sufficient radial dimension to abuttingly engage the open end of the female part during connection.

As the male part is inserted into the passage the split ring engages the outermost end of the female part displacing the sleeve away from the male part nose until a shoulder stop is encountered. Further insertion of the male part into the passage axially displaces the split ring upon the sleeve and upon sufficient insertion of the male part into the passage the split ring will be received within the sleeve groove giving a visual indication that the parts are fully connected. At such condition the free ends of the resilient fingers will have engaged with the male part shoulder closest to the nose preventing separation of the parts.

When fully connected a cylindrical surface defined upon the male part nose is sealingly engaged by the seals within the female part passage, and the nose is closely telescopingly received within the passage reduced diameter portion.

In an embodiment of the invention the transverse cross-sectional configuration of the male part nose and the female part reduced diameter portion may be non-circular so that the reception of the male part nose into the female part portion prevents relative rotation of the parts about their longitudinal axis.

If it is desired to disconnect the parts the split ring is removed from the sleeve, and the sleeve may then be axially displaced upon the male part between its shoulders into the recess engaging the resilient fingers and lifting them out of engagement with the male part shoulder thereby permitting the male part to be withdrawn from the passage.

Preferably, the base of the groove defined on the sleeve is of a highly visible color as to be readily observable by the operator, and upon the split ring being received within the groove, this highly visible surface is masked against observation permitting the operator to quickly discern that the parts are fully coupled.

As the removal of the split ring from the sleeve requires premeditated action, the split ring serves as a safety feature to discourage tampering with the tube connector, and requires positive and intentional action by the operator to permit the tube connector parts to be disconnected.

BRIEF DESCRIPTION OF THE DRAWINGS

The aforementioned objects and advantages of the invention will be appreciated from the following description and accompanying drawings wherein:

FIG. 1 is an elevational view, partially sectioned, showing the tube connector parts in axial alignment and prior to connection, FIG. 2 is an elevational, partially sectioned view of a tube connector in accord with the invention with the parts partially interconnected, the sleeve ring engaging the passage shouldered end, FIG. 3 is an elevational, partially sectioned view of the connector of the invention illustrating the relationship of the components during the connection sequence upon the sleeve engaging the male part shoulder stop, FIG. 4 is an elevational view, partially sectioned, illustrating the tube connector components in the fully connected condition, the indicator ring being received within the sleeve groove, FIG. 5 is an elevational view, partially sectioned, of the tube connector shown in the fully connected condition with the sleeve illustrated in the finger releasing position, FIG. 6 is an elevational, sectional view taken along Section VI—VI of FIG. 1, FIG. 7 is a plan view of the retainer element in its noncircular configuration, and FIG. 8 is an elevational, sectional view as taken along Section VIII—VIII of FIG. 5 with a nonrotative tube connector embodiment.

DESCRIPTION OF THE PREFERRED EMBODIMENTS

The tube connector of the invention consists of a female part 10 and a male part 12. The female part 10 includes the portion 14 upon which a tube conduit, not shown, may be inserted, as is well known. The female part also includes the reduced diameter portion 16, the seal portion 18 and the retainer portion 20 which is outwardly defined by a shouldered end 22. A plurality of annular O-ring type seals 24 of the O-ring type are located within portion 18 and a plurality of annular seal spacers 26 are located between the elastomeric seals 24.

The retainer is generally indicated at 28, FIG. 7, and is stamped from spring steel and includes a base 29 from which extend alternate long fingers 30 and short fingers 32. The retainer 28 is located within the retainer portion 20 of the female part passage and is formed into a circular configuration wherein the base 29 engages the inside of the shouldered end 22, and the free end of the long fingers 30 engage the outermost spacer 26 thereby retaining the seal and spacer assembly within seal portion 18. The short fingers 32 are deflected inwardly as will be appreciated from FIGS. 1 and 2.

The male part 12 includes an annular shoulder 34 defined thereon by axially displacing the metal of the male part forming a radial shoulder, and in a like manner an outer shoulder 36 is defined in axially spaced relationship to the shoulder 34. A nose 38 is defined on the male part between shoulder 34 and the outermost end of the male part, and in the embodiments of FIGS. 1-4 the nose 38 is of a cylindrical configuration and of a diameter as to be closely received within the seals 24 and the female part portion 16.

An annular sleeve 40 formed of a synthetic plastic material is located upon the cylindrical surface of the male part intermediate the shoulders 34 and 36 for axial displacement thereon between the shoulders. The sleeve 40 includes a cylindrical surface 42 disposed toward the nose 38 and an enlarged head 44 to facilitate manual manipulation and placement of the sleeve. The innermost end of the sleeve is slightly beveled as will be appreciated from the drawing.

An annular groove 46 is defined on the sleeve within the surface 42 and the base of the groove 46 is, preferably, painted with a highly visible color.

An indicator ring 48 encompasses the sleeve surface 42 and frictionally grasps the surface in that the normal diameter of the ring 48 is slightly less than that of the surface 42. The ring 48 is of a split configuration, FIG. 6, the ends thereof being shown at 50.

In operation, the components will be as shown in FIG. 1, it being understood that conduits, such as hose or tubing, not shown, will be connected to or be a part of parts 10 and 12. The sleeve 40 is freely axially displaceable upon the male part 12, and in FIG. 1 it is shown adjacent the shoulder 34.

Axial displacement of the parts 10 and 12 inserts the nose 38 into the open ended passage of the female part 10 wherein the nose 38 is sealingly received within the seals 24 as shown in FIG. 2. At such time the shoulder end 22 will engage the ring 48 mounted upon sleeve 40.

Further insertion of the male part 12 into the female part 10 causes the shoulder 34 to raise the fingers 32, FIG. 3, and the male part 12 will be axially displaced "through" the sleeve 40 due to the engagement of the ring 48 with the female part shoulder 22. This operation and relationship will continue until the sleeve 40 engages the shoulder 36 as shown in FIG. 3.

Further insertion of the male part 12 into the female part passage axially displaces the indicator ring 48 across the sleeve surface 42 toward the groove 46 and upon the insertion being of sufficient extent to permit the ends of the fingers 32 to clear the shoulder 34 so as to snap inwardly and prevent withdrawal of the male part 12 from the female part 10 the ring 48 will snap into groove 46 and mask the colored and visible groove base from observation by the operator. Thus, once the operator can no longer observe the color of the groove 46 he will be apprised that full connection has occurred and that a sealed and locked interrelationship between the female part 10 and the male part 12 has been achieved. The seals 24 prevent leakage, and the close reception of the nose 38 within portion 16 and the reception of the sleeve 40 within the shouldered end 42 provides a stable relationship between the parts 10 and 12 highly resistant to relative bending and, of course, engagement of the ends of fingers 32 with the shoulder 34 prevents withdrawal of the male part from the female part passage.

If it is desired to disconnect the parts the ring 48 is opened and removed from the groove 46, and the ring is completely removed from the sleeve. Once the ring 48 is removed from groove 46 the sleeve 40 may be manually pushed further into the female part passage engaging the forward beveled end of the sleeve with the underside of the fingers 32 lifting the fingers from engagement and alignment with the shoulder 34 and thereby permitting the part 12 to be withdrawn from the part 10.

In some applications it is desirable that rotation between the parts 10 and 12 be prevented, and in such instance the forwardmost portion of the male part nose 38', FIGS. 5 and 8, and the female part reduced diameter portion 16', are formed of a noncircular configuration, such as hexagonal, FIG. 8, wherein the close telescoping relationship acheived by these part portions will prevent relative rotation. In such instance, the configuration of the nose surface in radial alignment with the seals 24 is cylindrical to insure the sealed relationship between the parts 10 and 12, and yet, this nonrotation feature does not adversely affect the assembly operation in that the orientation between the parts 10 and 12 may be easily and quickly achieved.

As the removal of the ring 48 from the sleeve groove 46 requires positive and intentional action by the operator, inadvertent release of the retainer fingers will be prevented, and as the ring 48 requires knowledgeable and considerable manipulation to be removed from the groove tampering and unauthorized disconnection of the connector parts is discouraged.

It is appreciated that various modifications to the inventive concepts may be apparent to those skilled in the art without departing from the spirit and scope of the invention.

We claim:

1. A push-to-connect connector comprising, in combination, a female part having a passage defined therein, a male part axially receivable within said passage, retainer means mounted upon one of said parts engagable with the other part to maintain said parts in a fully connected condition upon said male part being fully axially inserted into said female part, and indicia means separate from said retainer means mounted upon said male part engagable with said female part during axial movement of said male part within said passage indicating the extent of axial insertion of said male part into said passage.

2. In a push-to-connect connection as in claim 1, said indicia means including a sleeve mounted upon said male part and an axially translatable indicator frictionally mounted upon said sleeve, an abutment defined on said female part, said indicator engaging said abutment as said parts are connected and being axially displaced on said sleeve during connection of said parts.

3. In a push-to-connect connection as in claim 2, a visible reference mark defined on said sleeve, said indicator masking said reference mark upon said parts being fully connected.

4. In a push-to-connect connection as in claim 3, said reference mark comprising an annular groove defined in said sleeve and said indicator comprising a resilient ring encompassing said sleeve and received within said groove upon said parts being fully connected.

5. In a push-to-connect connector as in claim 1, said passage including an open end, a reduced diameter portion axially spaced from said open end and a seal portion intermediate said open end and said reduced diameter portion and concentric thereto, a circular seal within said passage seal portion, said male part including a nose end and a cylindrical surface axially spaced from said nose end, said passage reduced diameter portion and said nose end portion being of complementary noncircular transverse cross section whereby upon said parts being fully axially connected said nose end closely telescopes into said reduced diameter portion to prevent relative rotation therebetween and said circular seal sealingly engages said cylindrical surface.

6. In a push-to-connect connector as in claim 5, said reduced diameter portion and said nose end being of a hexagonal transverse cross-sectional configuration.

7. A push-to-connect connector comprising, in combination, a female part having a passage defined therein, said passage having an open end, a shoulder defined on said female part adjacent said open end, an annular seal defined in said passage, a tubular male part having a nose receivable within said passage in sealed relationship with said seal, an annular sleeve mounted on said male part axially displaceable thereon between a first floating position and a second stop position, stop means defined on said male part limiting movement of said sleeve away from said nose when said sleeve is at said second position, said sleeve being receivable within said passage, observable indicia defined on said sleeve, indicia masking means displaceably mounted upon said sleeve engagable with said female part shoulder upon insertion of said male part into said passage whereby insertion of said male part nose into said female part passage translates said sleeve to said second position and said masking means masks said indicia upon said parts being fully connected, and retainer means mounted upon one of said parts engaging the other part upon said other parts being fully connected to maintaining the connection of said parts.

8. In a connector as in claim 7, said indicia masking means being frictionally mounted on said sleeve whereby the frictional force between said masking means and sleeve must be overcome to displace said masking means upon said sleeve.

9. In a connector as in claim 8, said masking means comprising a ring encompassing said sleeve.

10. In a connector as in claim 9, said ring being split and resiliently embracing said sleeve.

11. In a connector as in claim 9, said observable indicia comprising an annular groove defined in said sleeve having a base surface of a highly visible color, said ring being received within said groove and masking said base surface when said sleeve is at said second position.

12. In a connector as in claim 7, said retainer comprising resilient fingers, finger displacing means defined upon said sleeve engagable with said fingers upon said sleeve being sufficiently received within said passage displacing said fingers from said other part to permit disconnection of said parts.

13. In a connector as in claim 12, said masking means comprising a resilient split ring encompassing said sleeve, said ring being removed from said sleeve when said sleeve is to be inserted into said passage sufficiently to displace said fingers.

* * * * *